(12) United States Patent
Hollander et al.

(10) Patent No.: US 6,267,500 B1
(45) Date of Patent: **\*Jul. 31, 2001**

(54) METHOD AND APPARATUS FOR MEASURING TEMPERATURE USING INFRARED TECHNIQUES

(75) Inventors: Milton Bernard Hollander; William Earl McKinley, both of Stamford, CT (US)

(73) Assignee: Omega Engineering, Inc., Stamford, CT (US)

(\*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/145,549

(22) Filed: Sep. 2, 1998

Related U.S. Application Data

(60) Division of application No. 08/848,012, filed on Apr. 28, 1997, now Pat. No. 5,823,679, which is a continuation-in-part of application No. 08/764,659, filed on Dec. 11, 1996, now Pat. No. 5,823,678, which is a continuation-in-part of application No. 08/617,265, filed on Mar. 18, 1996, now Pat. No. 5,727,880, which is a continuation-in-part of application No. 08/348,978, filed on Nov. 28, 1994, now Pat. No. 5,524,984, which is a continuation of application No. 08/121,916, filed on Sep. 17, 1993, now Pat. No. 5,368,392.

(51) Int. Cl.[7] ............................. G01K 1/00; G01J 5/02; G01B 11/00

(52) U.S. Cl. ..................... 374/121; 374/120; 374/141; 33/DIG. 21; 362/35; 362/259; 356/49; 356/399; 250/491.1

(58) Field of Search .................... 374/121, 141, 374/120, 124; 33/241, DIG. 21; 362/35, 259; 356/49, 399; 250/491.1

(56) References Cited

U.S. PATENT DOCUMENTS

| 4,315,150 | \* | 2/1982 | Darringer et al. | 250/338 |
|---|---|---|---|---|
| 4,494,881 | \* | 1/1985 | Everest | 374/124 |
| 4,582,426 | \* | 4/1986 | Douglas | 374/121 |
| 4,591,256 |   | 5/1986 | Matsumura . |   |
| 5,258,871 |   | 11/1993 | Gupta . |   |

FOREIGN PATENT DOCUMENTS

| 32 13 955 | \* | 10/1982 | (DE) | 374/121 |
|---|---|---|---|---|
| 2203537A |   | 10/1998 | (GB) . |   |
| 62-12848 | \* | 2/1982 | (JP) | 374/121 |

OTHER PUBLICATIONS

Gaylord, Thomas K., Moharam, M. G., "Analysis and Applications of Optical Diffraction by Gratings," Proceedings of the IEEE, vol. 73, No. 5, May 1985, pp. 894–937.

The Optometrics Group, catalogue Transmission Grating Beamsplitters, 1993, pp. 60–61.

McCormick, F. B., "Generation of Large Spot Arrays From a Single Laser Beam by Multiple Imaging with Binary Phase Gratings," Optical Engineering, Apr. 1989, vol. 28, No. 4, pp. 299–304.

(List continued on next page.)

*Primary Examiner*—Andrew H. Hirshfeld
(74) *Attorney, Agent, or Firm*—William A. Drucker (57) ABSTRACT

An apparatus is provided for visibly outlining an energy zone to be measured by a radiometer. The apparatus includes a laser beam generator and an optical means. The optical means directs the laser beam to the energy zone to form a continuous ring for identifying the energy zone.

5 Claims, 10 Drawing Sheets

OTHER PUBLICATIONS

Harvey, James E.; Scott, Marion L., "Hole Grating Beam Sampler–Versatile High–Energy Laser (HEL) Diagnostic Tool," Optical Engineering, Nov./Dec. 1981, Vol. 30, No. 6, pp. 881–886.

Haidner, Helmut; Kipfer, Peter; Sheridan, John T.; Schwider, Johannes; Streibl, Norbert; Lindolf, Jürgen; Collischon, Martin; Lang, Anette; Hutfless, Joachim, "Polarizing Reflection Grating Beamsplitter for the 10.6–$\mu$m Wavelength," Optical Engineering, Aug. 1993, vol. 32, No. 8, pp. 1860–1865.

Molesini, G.; Pedrini, G.; Quercioli, F., "Laser Unequal Path Interferometer Configurations by Grating Splitting at the Fourier Plane," Optical Engineering, Sep./Oct. 1984, vol. 23, No. 5, pp. 646–649.

Mokry, Patricia A., "Unique Applications of Computer–Generated Diffractive Optical Elements," SPIE vol. 1052 Holographic Optics: Opitcally and Computer Generated (1989), pp. 163–171.

Munnerlyn, C. R., "A Simple Laser Interferometer," Applied Optics, Apr. 1969, vol. 8, No. 4, pp. 827–829.

Miler, Miroslav, "Photoresist as a Recording Material for Holographic Elements," SPIE vol. 2108, 8 pages.

Schmidt, J.; Völkel, R.; Stork, W.; Sheridan, J. T.; Schwider, J.; Streibl, N.; Durst, F., "Diffractive Beam Splitter for Laser Doppler Velocimetry," Optical Letters, Sep. 1, 1992, vol. 17, No. 17, pp. 1240–1242.

Kim, Richard C.; Case, Steven K., "Holographic Beamspliter for Multiple Plane Wave Formation with Matched Phasefronts," SPIE (1989) vol. 1052, pp. 52–64.

Shuying, Wang; Chun, Lei, "New Method of Designing High–Efficiency Multi–Beam Light–Splitter," SPIE vol. 1973, pp. 87–93.

Lu, Xuenong; Wang, Ying; Wu, Minxian; Jin, Guofan, "The Fabrication of a 25×25 Multiple Beam Splitter," vol. 72, No. 3,4, pp. 157–162.

Azzam, R. M. A.; Forgala, G. W., "Creation of an Optical XYZ Coordinate System Using Bidirectional Blazing From A Symmetric Triangular–Groove Grating in a Conical Diffration Mount," Optics Letters, vol. 18, No. 24, Dec. 24, 1993, pp. 2162–2164, USA.

Hong, Baojin; He, Yongrong; Ye, Ronghua, "Laser Grating Interferometer Using Grating as Beam Splitter," Zhongguo Jiguang/Chinese Journal of Lasers, vol. A20, No. 1, 1993, pp. 34–37, China.

Kawatsuki, N.; Uetsuki, M., "Crossed Grating Beam Splitter for Magnetooptical Pickup Head," Japanese Journal of Applied Physics Part 1—Regular Papers Short Notes & Review Papers, vol. 29, No. 11, Nov. 1990, pp. 2420–2433, Japan.

Lehureau, J. C.; Beguin, J. Y.; Colineau, J., "Polarizing Grating Beamsplitter Using a Liquid Crystal Cell," Japanese Journal of Applied Physics, Supplement, vol. 28, Suppl. 28–3, 1989, pp. 201–203, Japan.

Hansen, J. P.; Strong, J., "Performance of a Simple Spherical Lamellar Grating Beamsplitter by Wavefront Division," Aspen International Conference on Fourier Spectroscopy, Air Force Cambridge Res. Labs. 1971, pp. 215–220, Bedford, MA.

Pallister, D. M.; Liu, K–L; Govil, A.;, Morris, M. D.; Owen H.; Harrison, T. R., "Raman Microprobe with Holographic Beamsplitter for Low–Frequency Operation," Applied Spectroscopy, vol. 46, No. 10, Oct. 1992, pp. 1469–1473, USA.

Courjon, D; Bulabois, J., "Noncoherent Microholography Using a Holographic Optical Element As A Beamsplitter," Optical Engineering, vol. 20, No. 2, Mar.–Apr. 1981, pp. 233–235, USA.

Spornik, N. M.; Tuev, A. F., "Universal Interferometer with the Reference Wave Formed From the Object Wave," Optiko–Mekhanicheskaya Promyshlennost, vol. 59, No. 9, Sep. 1992, pp. 53–56, Russia.

Mikes, T., "Fringe Benefits: Applications of Holographic Elements," Photronics Spectra, vol. 17, No. 3, Mar. 1983, pp. 40–44, USA.

* cited by examiner

METHOD AND APPARATUS FOR MEASURING TEMPERATURE USING INFRARED TECHNIQUES

RELATED APPLICATIONS

This application is a division of application Ser. No. 08/848,012, filed Apr. 28, 1997, now U.S. Pat. No. 5,823, 679, which is a continuation-in-part of application Ser. No. 08/764,659, filed Dec. 11, 1996, now U.S. Pat. No. 5,823, 678, which is a continuation-in-part of application Ser. No. 08/617,265, filed Mar. 18, 1996, now U.S. Pat. No. 5,727, 880, which is a continuation-in-part of application Ser. No. 08/348,978, filed Nov. 28, 1994, now U.S. Pat. No. 5,524, 984, which is a continuation of application Ser. No. 08/121, 916, filed Sep. 17, 1993, now U.S. Pat. No. 5,368,392 and re-examined as U.S. Pat. No. B-5,368,392.

BACKGROUND OF THE INVENTION

1. Field of the Invention

The present invention relates generally to a method and apparatus for more accurately measuring the temperature of a surface using infrared measurement techniques and, more particularly, to such a method and apparatus which utilises a laser sighting device which is adapted to project at least a circumscribing laser sighting beam or beams for more clearly defining the periphery of the energy zone from which the temperature is measured. Generally speaking, this has been accomplished by directing the laser beam about the periphery of the energy zone; by the use of three or more stationary laser beams which are focused on the periphery of the energy zone; or by the use of a controlled single laser beam directed towards three or more predetermined locations on the periphery of the energy zone. In an alternative embodiment, a single laser beam may be rotated around the periphery of the energy zone using, for example, slip rings. In another embodiment, the single rotating laser may be pulsed on and off in a synchronised manner in order to produce a series of intermittent lines outlining the energy zone, thus increasing the efficiency of the laser by concentrating its total wattage in a smaller area, causing a brighter beam. Further, the circumscribing beam or beams may be used in conjunction with an additional beam directed at and defining a central spot, or larger central area, of the energy zone.

In yet another method and embodiment, at least one laser beam is subdivided by passing it through a diffraction grating, for example, into a plurality of three or more subdivision beams which can form a pattern of illuminated spot areas on a target whose energy zone is to be investigated with a radiometer. Herein 'a plurality' means three or more, e.g. six or twelve.

2. Description of the Prior Art

Remote infrared temperature measuring devices (commonly referred to as infrared pyrometers or radiometers) have been used for many years to measure the temperature of a surface from a remote location. Their principle of operation is well known. All surfaces at a temperature above absolute zero emit heat in the form of radiated energy. This radiated energy is created by molecular motion which produces electromagnetic waves. Thus, some of the energy in the material is radiated in straight lines away from the surface of the material. Many infrared radiometers use optical reflection and/or refraction principles to capture the radiated energy from a given surface. The infrared radiation is focused upon a detector, analysed and, using well known techniques, the surface energy is collected, processed and the temperature is calculated and displayed on an appropriate display.

Examples of such infrared radiometers are illustrated at pages J-1 through J-42 of the *Omega Engineering Handbook*, Volume 2B. See, also, U.S. Pat. No. 4,417,822 which issued to Alexander Stein et al. On Nov. 29, 1983 for a Laser Radiometer; U.S. Pat. No. 4,527,896 which issued to Keikhosrow Irani et al. on Jul. 9, 1985 for an Infrared Transducer-Transmitter for Non-Contact Temperature Measurement; and U.S. Pat. No. 5,169,235 which issued to Hitoshi Tominaga et al. for Radiation Type Thermometer on Dec. 8, 1992. Also see Baker, Ryder and Baker, Volume II, *Temperature Measurement in Engineering*, Omega Press, 1975, Chapters 4 and 5.

When using such radiometers to measure surface temperature, the instrument is aimed at a target or 'spot' within the energy zone on the surface on which the measurement is to be taken. The radiometer receives the emitted radiation through the optical system and is focused upon an infrared sensitive detector which generates a signal which is internally processed and converted into a temperature reading which is displayed.

The precise location of the energy zone on the surface as well as its size are extremely important to insure accuracy and reliability of the resultant measurement. It will be readily appreciated that the field of view of the optical systems of such radiometers is such that the diameter of the energy zone increases directly with the distance to the target. The typical energy zone of such radiometers is defined as where 90% of the energy focused upon the detector is found. Heretofore, there have been no means of accurately determining the perimeter of the actual energy zone unless it is approximated by the use of a 'distance to target table' or by actual physical measurement.

Target size and distance are critical to the accuracy of most infrared thermometers. Every infrared instrument has a field of view (FOV), an angle of vision in which it will average all the temperatures which it sees. Field of view is described either by its angle or by a distance to size ratio (D:S). If the D:S=20:1, and if the distance to the object divided by the diameter of the object is exactly 20, then the object exactly fills the instruments field of view. A D:S ratio of 60:1 equals a field of view of 1 degree.

Since most infrared thermometers have fixed-focus optics, the minimum measurement spot occurs at the specified focal distance. Typically, if an instrument has fixed-focus optics with a 120:1 D:S ratio and a focal length of 60" the minimum spot (resolution) the instrument can achieve is 60 divided by 120, or 0.5" at a distance of 60" from the instrument. This is significant when the size of the object is close to the minimum spot the instrument can measure.

Most general-purpose infrared thermometers use a focal distance of between 20" and 60" (50 and 150 cm); special close-focus instruments use a 0.5" to 12" focal distance. See page Z54 and Z55, volume 28, *The Omega Engineering Handbook*, Vol. 28. In order to render such devices more accurate, laser beam sighting devices have been used to target the precise center of the energy zone. See, for example, pages C1–10 through C1–12 of *The Omega Temperature Handbook*, Vol. 27. Various sighting devices such as scopes with cross hairs have also been used to identify the center of the energy zone to be measured. See, for example, Pages C1–10 through C1–21 of *The Omega Temperature Handbook*, Vol. 27.

The use of a laser to pinpoint only the center of the energy zone does not, however, provide the user with an accurate definition of the actual energy zone from which the measurement is being taken. This inability frequently results in inaccurate readings. For example, in cases where the area from which radiation emits is smaller than the target diameter limitation (too far from or too small a target), inaccurate readings will occur.

One method used to determine the distance to the target is to employ an infrared distance detector or a Doppler effect distance detector or a split image detector similar to that used in photography. However, the exact size of the energy zone must still be known if one is to have any degree of certainty as to the actual area of the surface being measured. This is particularly true if the energy zone is too small or the surface which the energy zone encompasses is irregular in shape. In the case where the surface does not fill the entire energy zone area, the readings will be low and, thus, in error.

Similarly, if the surface is irregularly shaped, the readings will also be in error since part of the object would be missing from the actual energy zone being measured.

Thus, the use of a single laser beam only to the apparent center of the energy zone does not insure complete accuracy since the user of the radiometer does not know specifically the boundaries of the energy zone being measured.

As will be appreciated, none of the prior art recognises this inherent problem or offers a solution to the problems created thereby.

Proposals have been made in the prior art for indicating an energy zone area of a target surface by means visible to the eye at the target.

A first kind of such indication utilises multi-spectral light, as evidenced for example in the Japanese Publication No. S57-22521 which teaches the use of an incandescent light source to outline an energy zone at the target. Japanese Publication No. 62-12848 suggests a similar use of multi-spectral light to outline an energy zone at the target. Reference is made to Japanese case JP 63-145928.

Further, U.S. Pat. No. 4,494,881 EVEREST also suggests using a multi-spectral light source together with a beam splitter arrangement which permits the infra-red received beam and the multi-spectral light to utilise the same optical arrangement. EVEREST teaches the use of a visible light source such as an incandescent lamp or strobe light which is projected against the target surface, the temperature if which is to be measured. This adds additional energy to the same energy zone where the temperature measurement is to be taken, and this destroys accuracy. When EVEREST uses a beam splitter, the incandescent light beam causes the beam splitter to act as a radiator of infrared energy. When EVEREST uses a Fresnel lens, the light tends to elevate the temperature of the Fresnel lens, which in turn reflects back to the infra-red detector.

This manner of indication, utilising incoherent multi-spectral light, has the disadvantage amongst others that the multi-spectral light itself has a heat factor which can cause incorrect reading by the energy detecting means of the apparatus.

A laser is Light Amplification by Stimulated Emission of Radiation. This device was invented in 1960 to produce an intense light beam with a high degree of coherence. Atoms in the material emit in phase. Laser light is used in holography. A light beam is coherent when all component waves have the same phase. A laser emits coherent light, but ordinary electric incandescent light is incoherent in which atoms vibrate independently.

It is not possible simply to substitute a laser for an incandescent light source, because the incandescent beam is incoherent in nature, so that when projected parallel and in close proximity to the boundaries of the invisible infra-red zone, incandescent light inside the infra-red zone is reflected as heat energy. Moving the incandescent beam well away from the infra-red zone clearly does not permit accurate delineation of the target zone.

A second kind of energy zone indicator utilises coherent-laser light, as evidenced for example in U.S. Pat. No. 4,315,150 of DERRINGER, which is directed to a targeted infrared thermometer in which a laser is provided to identify the focal point, i.e. the center, of the energy zone, but there is nothing in DERRINGER to suggest causing more than two laser beams to outline the energy zone.

U.S. Pat. No. 5,085,525 BARTOSIAK ET AL teaches use of a laser beam to provide a continuous or interrupted line across a target zone to be investigated, but there is no suggestion to outline a target zone, nor to indicate a central point or central area of the target zone.

German patent publications of interest include:

DE-38 03 464;

DE-36 07 679 to a laser sighting device.

DE-32 13 955; to a beam splitter and to dual laser beams to indicate position and diameter of the energy zone.

All of the above noted prior art is hereby incorporated into this case by reference thereto.

SUMMARY OF THE INVENTION

Against the foregoing background, it is a primary object of the present invention to provide a method and apparatus for measuring the temperature of a surface using infrared techniques.

It is another object of the present invention to provide such a method and apparatus which provides more accurate measurement of the surface temperature than provided by the use of techniques heretofore employed.

It is yet another object of the present invention to provide such a method and apparatus which permits the user visually to identify the location, size and temperature of the energy zone on the surface to be measured.

It is still yet another object of the present invention to provide such method and apparatus which employs a heat detector and a laser beam or beams for clearly outlining the periphery of the energy zone of the surface.

It is a still further object of the present invention to provide a method and apparatus which permits the use of a single laser beam which is subdivided by passing it through, or over, a beam splitter, holographic element or a diffraction grating, thereby to form a plurality of three or more subdivision beams which provide a pattern where they strike a target whose energy zone is to be investigated.

It is still further object of the invention to provide a method and apparatus which utilises not only a beam or beams for outlining the energy zone, but also an additional beam or beams directed at and illuminating an axial central spot, or larger central area, of the energy zone.

For the accomplishment of the foregoing objects and advantages, the present invention, in brief summary, comprises a method and apparatus for visibly outlining the energy zone to be measured by a radiometer. The method comprises the steps of providing a radiometer with a detector and a laser sighting device adapted to emit at least one laser beam against a surface whose temperature is to be measured and controlling said laser beam towards and about the energy zone to outline visibly said energy zone. The beam is controlled in such a fashion that it is directed to three or more predetermined points of the target zone. This can be done mechanically or electrically.

Another embodiment of this invention employs a plurality of three or more laser beams to describe the outline and optionally also the center of the energy zone either by splitting the laser beam into a number of points through the use of optical fibres or beam splitters or a diffraction device or the use of a plurality of lasers. One embodiment of the apparatus comprises a laser sighting device adapted to emit at least one laser beam against the surface and means to rotate said laser beam about the energy zone to outline visibly said energy zone. This rotation can be by steps or continuous motion.

Another embodiment consists of two or more stationary beams directed to define the energy zone. The three or more laser beams could each be derived from a dedicated laser to each beam or by means of beam splitters. This can be accomplished by mirrors, optics, a diffraction grating, and fibre optics.

Another embodiment consists of a laser beam splitting device that emits one laser beam which is split into a plurality of three or more beams, by a diffraction grating, for example, to outline the energy zone and optionally to indicate a central spot or larger central area of the energy zone.

In a still further embodiment, the temperature measurement device comprises a detector for receiving the heat radiation from a measuring point or zone of the object under examination. Integral to the equipment is a direction finder, i.e. a sighting device using a laser beam as the light source and incorporating a difractive optic, i.e. a holographic component such as a diffraction grating, or a beam splitter, with which the light intensity distribution is also shown and the position and size of the heat source is indicated. The marker system relates to a predetermined percentage e.g. 90%, of the energy of the radiated heat.

The method includes visually outlining and identifying the perimeter of the energy zone by projecting more that two laser beams to the edge of the 90% energy zone to mark out the limits of the surface area under investigation for example, by a series of dots or spots which form a pattern.

Two or more embodiments may be used together or alternately.

BRIEF DESCRIPTION OF THE DRAWINGS

The foregoing and still other objects and advantages of the present invention will be more apparent from the detailed explanation of the preferred embodiments of the invention in connection with the accompanying drawings, wherein.

BRIEF DESCRIPTION OF THE PREFERRED EMBODIMENTS

Figures 1, 2, 2A, 2B:
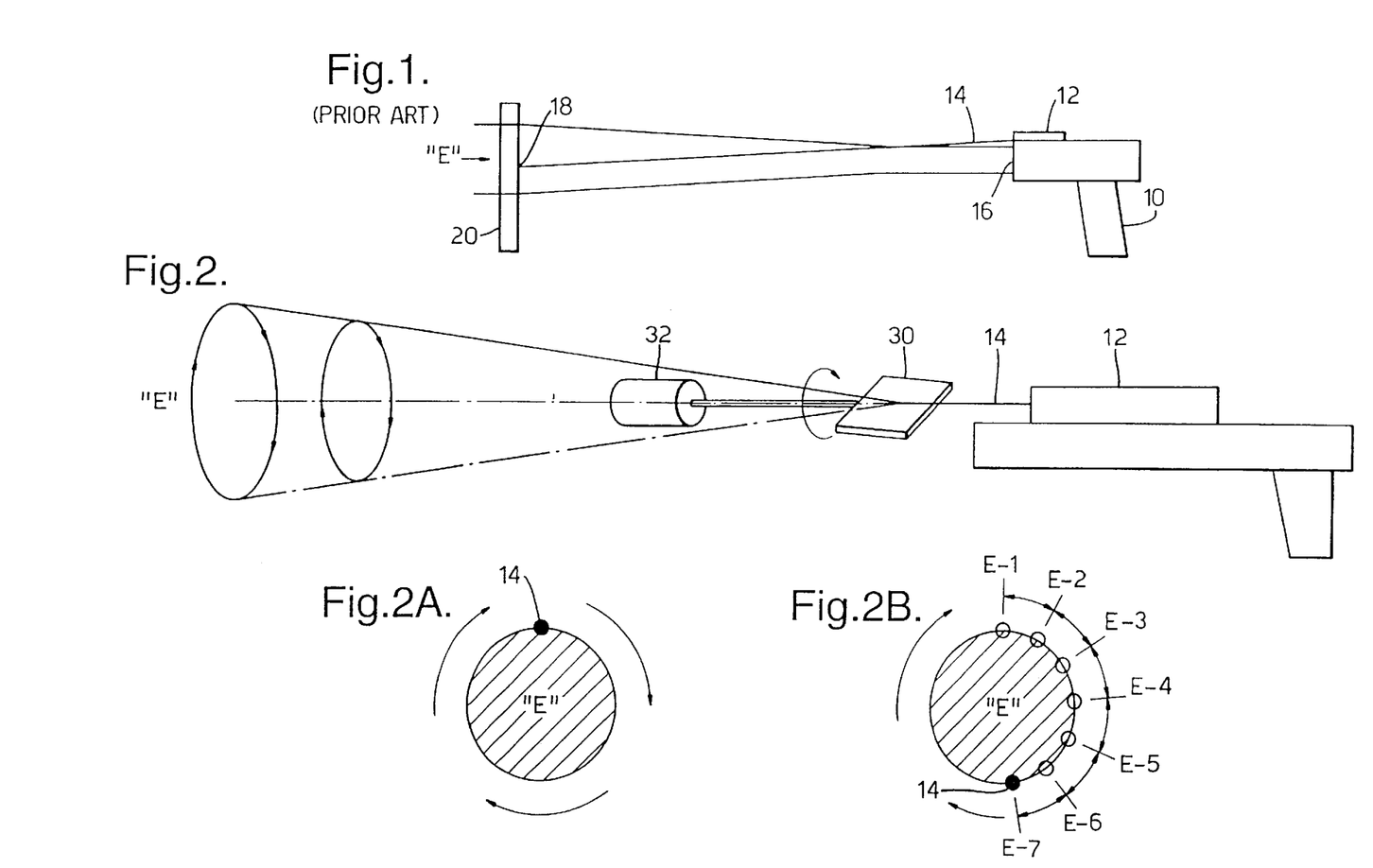
FIG. 1 is a schematic illustration of the prior art type of radiometers using laser sighting devices.
FIG. 2 is a schematic illustration of one embodiment of the present invention in which the laser beam is circumscribing the target zone using a mirror.
FIGS. 2A and 2B illustrate the manner in which the laser beam is relocated in stepped fashion to identify the energy zone.

Traditional, prior art radiometers have long employed laser sighting devices and direction finders to assist in the proper aim and alignment of the instrument. FIG. 1 illustrates and direction finders the operation of traditional, prior art, hand held radiometers. Such a radiometer, referred to generally by reference numeral 10, includes a laser sight scope 12 which emits a laser beam 14 to a spot or target 18 on the surface 20 whose temperature is to be measured. This spot 18 is located in the center of the energy zone 'E' which is to be measured by the radiometer 10. The radiometer 10 includes a detector 16 which is connected to conventional internal circuitry and display means (not shown) for conversion, calculation and display of the temperature of the surface 20 calculated indirectly from the energy radiated from the surface within the energy zone E. Such energy is radiated in straight lines in all directions away from the surface 20 and captured with the detector 16 on the radiometer 10. Using infrared radiation principles, the radiometer is thus able to capture and measure the infrared energy in the energy zone E and to display the surface temperature thereof.

The actual size and shape of the energy zone E is determined by the optics of the radiometer and the distance between the radiometer and the target. Each radiometer has a defined angle of vision or 'Field of view' which is typically identified in the instrument's specification sheet. The size of the energy zone E is predetermined when the field of view is known in conjunction with the distance to the target. Obviously, the further the radiometer is held from the target (i.e., the greater the distance), the larger the energy zone E.

This can be expressed in a 'distance to spot size ratio'. For example, with a 'distance to spot size ratio' of 40:1 the periphery of the energy zone would have a 1" diameter at a distance of 40" or, at a distance of 20" the diameter of the energy zone would be ½". The manufacturer of the pyrometer usually provides field of view diagrams for determining the energy zone at specific distances.

As can readily be appreciated, however, such laser aiming devices are merely able to identify the center of the energy zone being measured and not the outer periphery, as distinct from the diameter, of the actual energy zone from which the measurement is being taken. The further away from the surface the radiometer 10 is positioned, the larger the energy zone E. Thus, depending upon the size and configuration of the surface 20, the actual energy zone E may, conceivably, include irregular shaped portions of the surface 20 or even extend beyond the edges of the surface. Of course, in such instances, the resultant measured temperature would be inaccurate. Without knowing the outer perimeter of such energy zone E, the user of the radiometer 10 would have no knowledge of such fact and the resultant readings could be inaccurate.

The present invention provides a means for visibility defining the energy zone E so that the user of the radiometer 10 can observe the actual energy zone being measured to determine where it falls relative to the surface being measured. In the various embodiments of this invention, a fine laser line or lines is projected against the surface being measured and such line or lines is positioned so as to encompass the periphery of the energy zone E. If a rotating laser beam is employed, positioning can be effected, alternatively by moving either the laser itself or the laser beam emitted from the laser or from a laser beam splitter.

If the perimeter of the energy zone E could be identified on the object by the movement of the laser beam in a path about the circumference of the energy zone E, the user would be able quickly and accurately to determine if the energy zone from which the measurement was being taken was fully on the surface to be measured and whether its surface was of the type which would provide an otherwise accurate measurement.

The periphery of the energy zone E is identified as a function of the stated 'field of view' of the particular radiometer as identified in its specifications and the distance between the radiometer and the target. Identification of the size and shape of the energy zone is easily done using conventional mathematical formulae. Once identified, the laser beams are then projected about the periphery of the energy zone E in accordance with the methods and apparatus hereinafter described. One simple 'aiming' approach is to project the laser beam at the same angle as the field of view of the radiometer emanating from the same axis or, alternatively, by mechanically adjusting the laser beam angle in accordance with the 'distance to spot size ratio' calculations. In either event, the periphery of the energy zone E would be identified by the laser beams.

FIG. 2 illustrates a first embodiment of the present invention in which the laser aiming device 12 emits a laser beam 14 which is aimed at a mirrored surface 30 which is positioned in front of the laser beam 14. The mirror 30 is rotated using motive means 32 so as to rotate the beam in a circular fashion to define the energy zone E on the surface being measured. Alternatively, the mirror 30 can be rotated by vibratory means or by the application of a magnetic field (not shown). Rotation of the mirror 30 should be at a refraction angle which corresponds to the 90% energy zone E thereby permitting the laser beam 14 to rotate about the periphery of the energy zone E and thereby making it visible to the user of the radiometer 10.

It should be appreciated that the laser aiming device 12 may be an integral part of the radiometer 10 or, alternatively, a separate unit that may be mounted on or near the radiometer 10.

Alternatively, a prism can be used in place of the mirror 30 with predetermined angles to cause the prism to function as the reflecting mirror surface and, thereby, direct the laser beam about the perimeter of the energy zone.

FIGS. 2A and 2B illustrate the manner in which laser beams can be used to outline the energy zone E on the surface to be measured. It is important that rotation of the beam 14 be carefully controlled so that rotation is at a speed which can be visually followed. This will permit full beam intensity. As illustrated in FIGS. 2A and 2B, the laser beam is rotated about the energy zone E through a series of steps with the laser beam being permitted to remain in each step for at least one hundredth of a second before moving to its next position. This is accomplished by creating a plurality of steps E-1, E-2 etc., around the energy zone E, The laser beam 114 would stop at each step for the predetermined period of time to permit the beam to be observed before moving to the next step.

Figure 3:
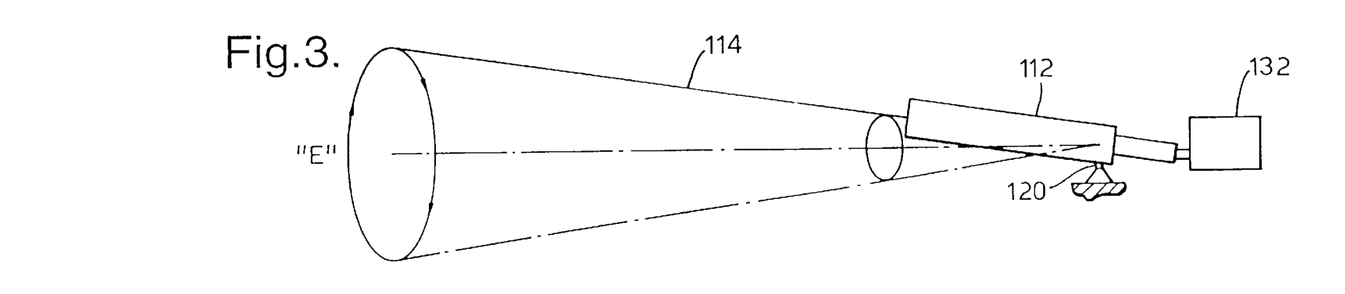
FIG. 3 is a schematic illustration of an alternative embodiment of the present invention in which the laser is pivoted about a pivot point by the use of mechanical motive means.

FIG. 3 illustrates another embodiment of the present invention in which the laser 112 itself is rotated or displaced so as to scribe a circle or other closed figure which defines the energy zone E by mechanically pivoting the laser 112 about pivot point 120 using motive means 132. Alternatively, the laser 112 can be rotated by vibratory means (not shown) or by the application of a magnetic field (not shown). Rotation of the laser 112 should, however, be at a refraction angle which corresponds to the 90% energy zone E thereby permitting the laser beam 114 to rotate about the periphery of the energy zone E to make it visible to the user of the radiometer 10.

Figure 4:
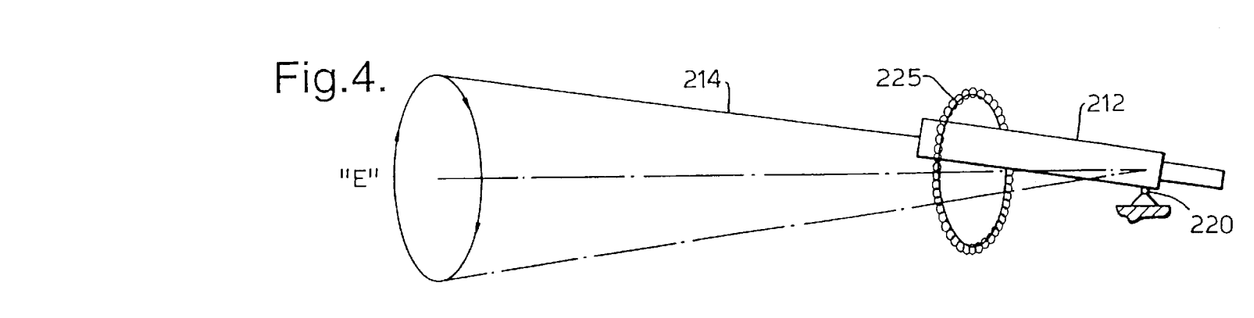
FIG. 4 is a schematic illustration of another alternative embodiment of the present invention in which the laser is directed through a magnetic field to identify the target zone.

In FIG. 4, the laser 212 is rotated about a pivot point 220 by the application of a magnetic field 225 so as cause the emission of the laser beam 214 around the periphery of the 90% energy zone E to make the beam visible to the user of the radiometer 10. In such embodiment, means (not shown) are provided for modifying the magnetic field 225 to correspond to the 90% energy zone so as to permit the laser to be rotated accordingly.

Figure 5:
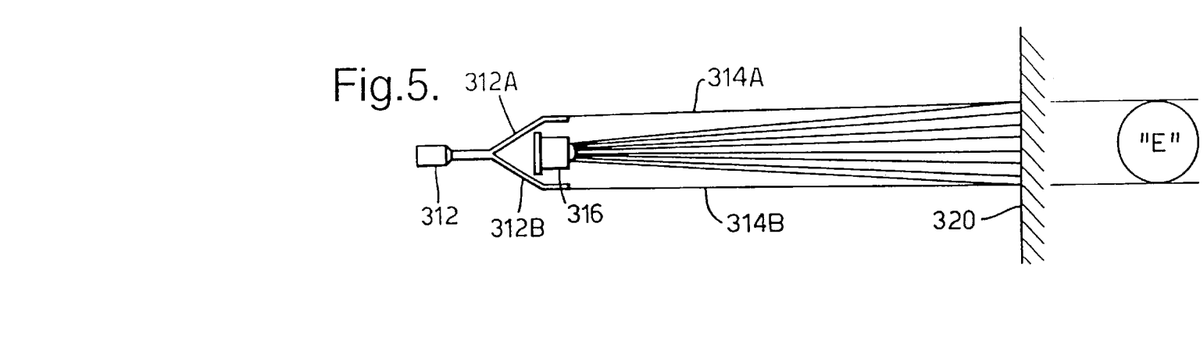
FIG. 5 is a schematic illustration of another alternative embodiment of the present invention in which a number of individual laser beams are projected so as define the energy zone being measured.

In FIG. 5, the laser 312 has at least two components 312A and 312B which produce at least two individual laser beams 314A and 314B about the detector 316. These at least two individual beams 314A and 314B are directed to the surface 320 being measured at the perimeter of the energy zone E rather that at the center of the energy zone E. Through the use of a number greater than two of such laser beams, the significant energy zone E becomes clearly identified rather than merely the center of the E zone. If desired, individual lasers can be used or laser splitting devices can be used to split a single laser beam. A diffraction device such as a grating or holographic component may be used to form multiple beams. Two lasers may be adapted to project a pair of laser beams on different sides of said energy zone.

Figure 6:
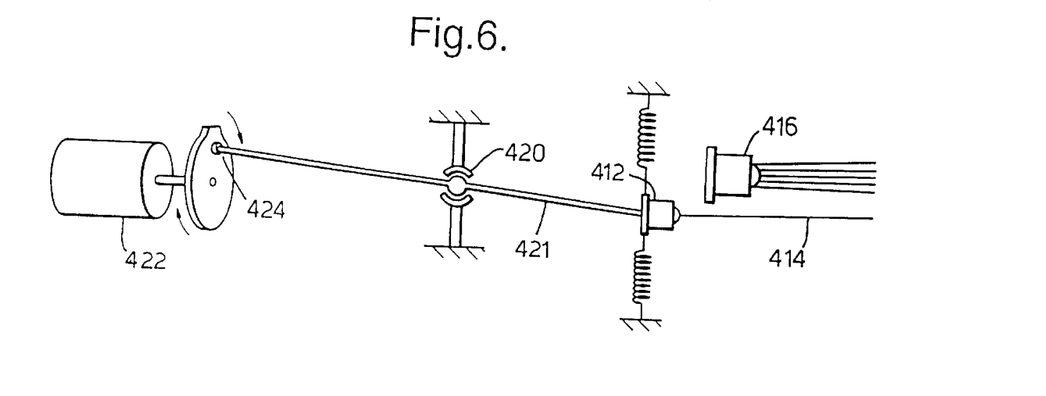
FIG. 6 is a schematic illustration of another alternative embodiment of the present invention in which the laser is mechanically pivoted.

FIG. 6 illustrates yet another embodiment of the present invention in which the laser 412 is mechanically pivoted in a circular fashion around the detector 416 so as to emit a laser beam 414 in a circular path on the surface (not shown) thereby defining the energy zone E. Laser 412 is pivotally mounted on pivot bearing 420 provided on connecting arm 421. Arm 421 is mounted on pivot bearing 424 which is rotated by motor 422. In such a manner, the laser beam 414 emitted from the laser 412 rotates about and outlines the energy zone E on the surface from which the temperature is being measured.

Figure 7:
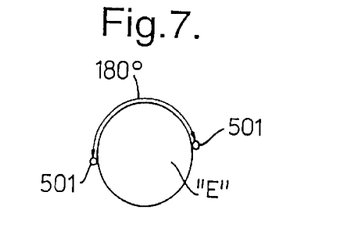
FIG. 7 is a schematically illustrates the positioning of fiber optics to create a pattern of the target zone with the laser beam.

The rotation of the laser beam may be effected using beam splitter or fiber optic techniques as shown in FIG. 7 in which the laser beam is projected thorough fiber optic means 501. In such manner, the beams fan out from the laser source and encircle and thereby define the energy zone E. By the use of a sufficient number of fiber optics, one can outline the circumference of the target area E with a light ring or by a ring of dots. This can be accomplished by as few as two fibers 501 positioned 180 degrees apart since the pick up pattern would be circular. Further fiber optic means may serve to direct a laser beam onto a central spot, or larger central area, of the energy zone.

Figure 8:
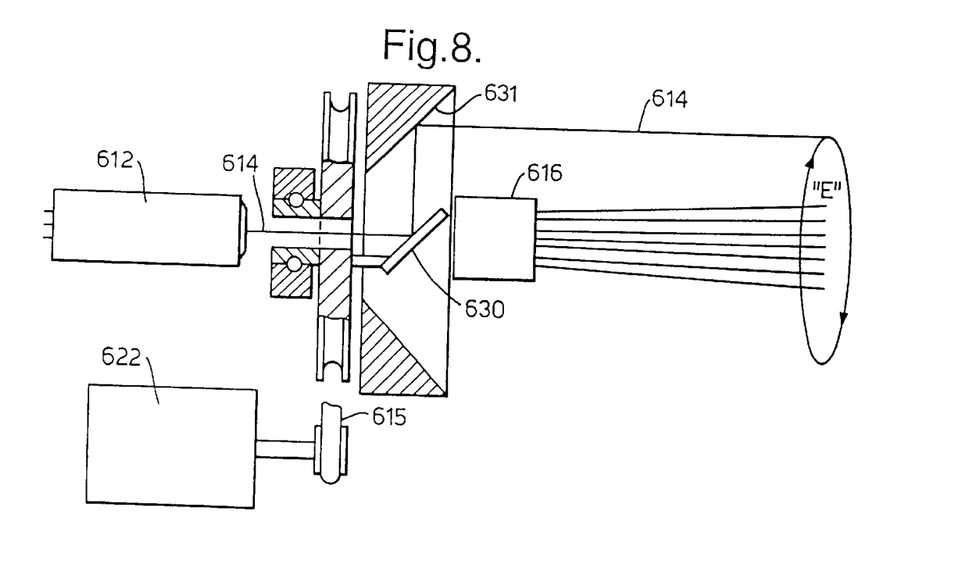
FIG. 8 is a detailed sectional view of another alternative embodiment of the present invention in which the laser is mechanically pivoted about the detector.

FIG. 8 illustrates still another means of effecting rotation of the laser beam 614 emitted from laser 612. In this manner, the laser beam 614 is directed against a rotating flat surface mirror 630 where it is reflected against a plated plastic cone mirror 631. The reflected beam is then projected to the surface and defines the perimeter of the energy zone E. The flat mirror 630 is driven by motor 622. In such manner, the laser beam 614 rotates about the circumference of the energy zone E on the surface being measured. The mirrors are positioned at such an angle that the laser projection is at the same angle as the infrared detector pickup angle.

Figure 9A:
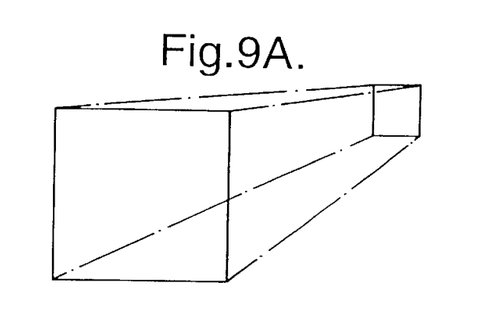
FIGS. 9A–C illustrate alternative configurations of the outlines which can be projected using the apparatus of the present invention.
Figure 9B:
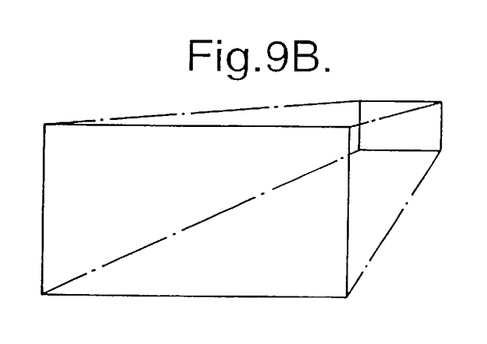
Figure 9C:
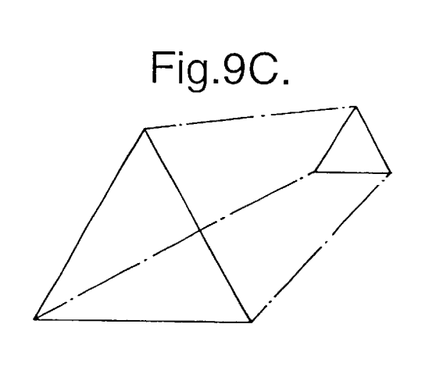

It will, of course, be appreciated that the energy zones E may assume configurations other than the circular configuration shown in FIGS. 1–8. FIGS. 9A–C illustrate alternative square (FIG. 9A), rectangular (FIG. 9B), and triangular (FIG. 9C) configurations for the light patterns which may be accomplished using the means of the present invention. A closed configuration is preferred. This may include three or more dots or spots.

Figure 10:
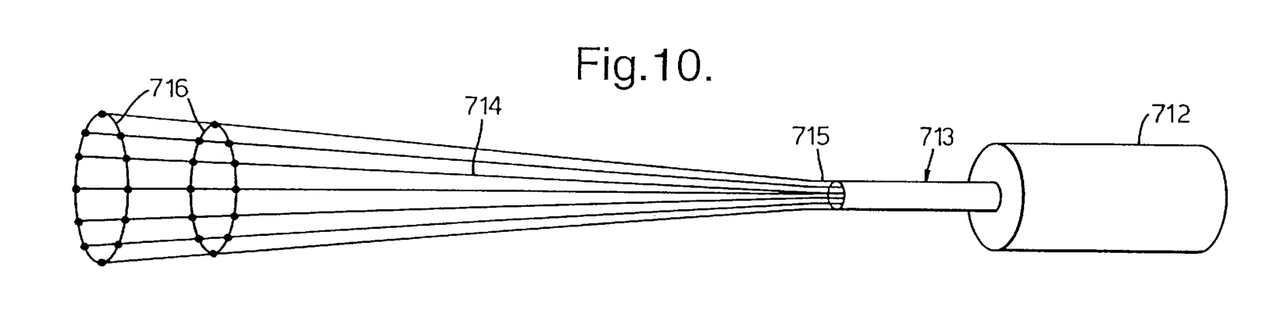
FIG. 10 is a schematic illustration of an embodiment of the invention wherein the laser is divided into a plurality of laser beams defining the energy zone by the use of optical fibres.

FIG. 10 illustrates a method for defining the energy zone where a circular configuration can be accomplished without rotation of the laser beam wherein a plurality of fixed optical fibers positioned to project a number of spots is employed. In this figure, a fixed laser 712 projects a beam 713 which is split into a plurality of beams 714 by a bundle of optical fibers 715 in order to project a pattern 716 onto the surface defining the energy zone E. Additional configurations may also be used, if desired. A diffraction means will also produce such a pattern.

Referring to FIG. 10, the means for projecting a plurality of laser beams (the bundle 715) will likewise include optical fibers arranged to project a laser beam axially so as to cause the plurality of laser beams to identify and define both the center and the periphery of the energy zone, e.g. by providing a single center spot or larger central area on the surface to be measured.

Figure 11:
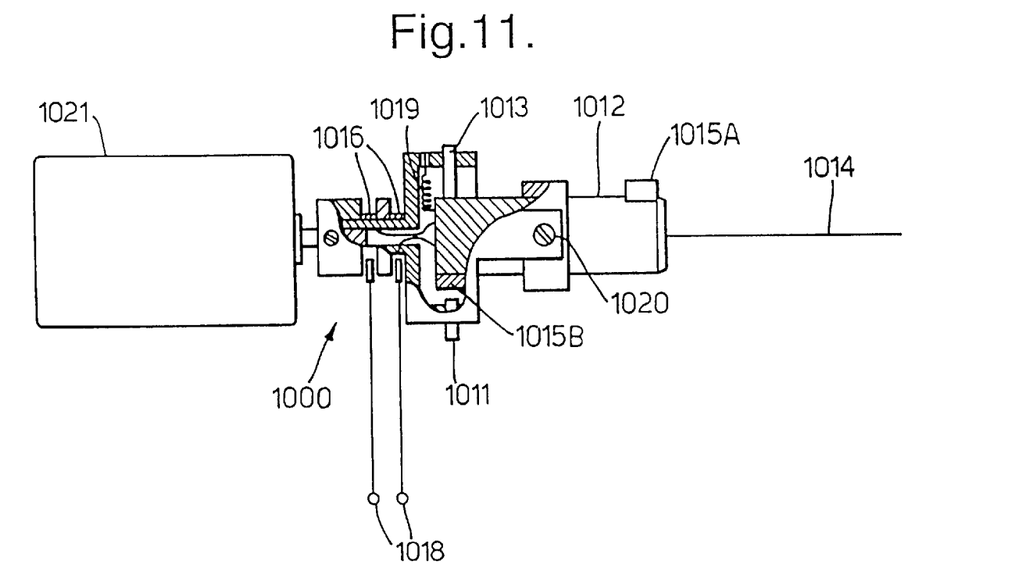
FIG. 11 is a cross sectional side view of a laser sighting device which may be used in conjunction with a radiometer in which the laser is rotated using slip rings.
Figure 12:
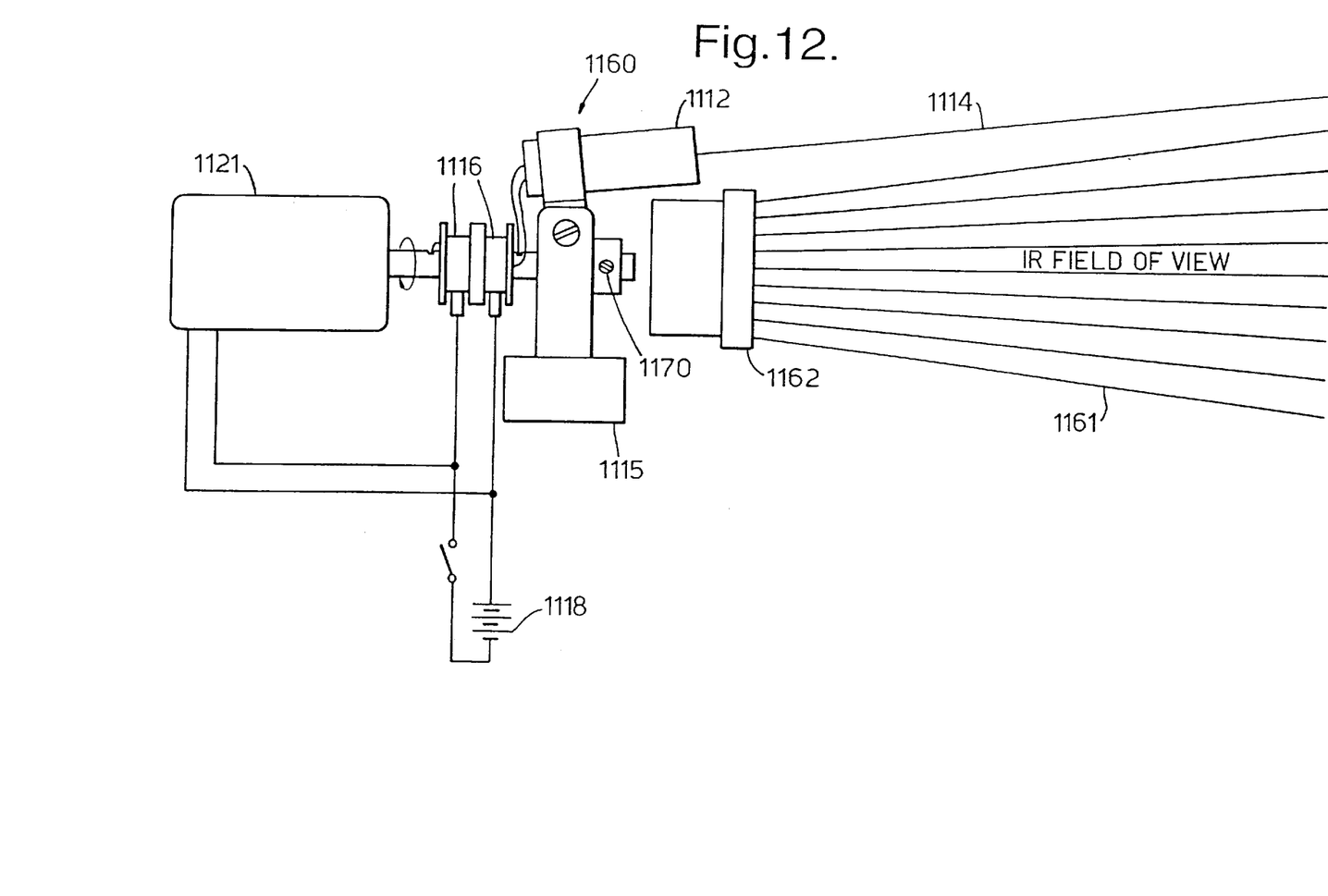
FIG. 12 is a side view illustrating a modified version of the laser sighting device of FIG. 11 with the sighting device mounted on an infrared detector.

FIGS. 11–12 illustrate further embodiments of the present invention in which the laser is adapted to be rotated by the use of slip rings and counter weights. For example, FIG. 11 illustrates one such laser sighting device 1000. Laser sighting device 1000 can be provided as an integral unit in combination with an infrared detector (not shown) or, alternatively, may be self contained as a removable sighting device which can be attached to and removed from infrared detectors.

The laser sighting device 1000 of FIG. 11 includes a laser 1012 powered by power source 1018 which projects a laser beam 1014 against a target. The laser 1012 is pivotally mounted about pivot 1020. Motor 1021 is provided for powering the sighting device and causing the laser 1012 to rotate. An external switch (not shown) may be provided to turn the motor 1021 on and off and, as such, the rotation of the laser 1012. Upper and lower screw adjustments 1013 and 1011, respectively, are provided for controlling the position of the laser 1012 and, more importantly, the direction of the laser beam 1014. Upper screw adjustment 1013 is adapted to be used during non-rotation while lower screw adjustment 1011 is used during rotation of the laser 1012.

The laser 1012 is powered with power source 1018. Slip rings 1016 are provided to facilitate rotation of the laser 1012. Upper and lower counterweights 1015A and 1015B, respectively are provided above and below the laser 1012 and a return spring 1019 is also provided.

The laser 1012 of the sighting device 1000 in FIG. 11 is adapted to rotate about the pivot 1020 when driven by the motor 1021, Thus, the laser 1012 is able to project a laser beam 1014 with a circle-type pattern against a target (not shown). During rotation, centrifugal force will act upon the counterweights 1015A and 1015B causing the laser 1012 to tilt. The angle at which it tilts can be controlled by the screw adjustment 1013 and 1011. The angle is adjusted to correspond to the infrared detector field of the infrared detector in which the sighting device is used. The laser beam 1014 will then follow the periphery of the target zone of the infrared detector (not shown). Once the motor 1021 is turned off, the return spring 1019 will cause the laser 1012 to center. In this manner, the laser beam will now be in the centre of the target zone. This serves as a calibration for the user and insures that the laser sighting device is properly aimed.

A modified version of the laser sighting device of FIG. 11 is illustrated in FIG. 12. Laser sighting device 1100 is shown in combination with an infrared detector 1162 which has an infrared field of view 1161. Laser sighting device 1100 includes a laser 1112 which projects a laser beam 1114. Laser 1112 is pivotally mounted on pivot 1120. A counterbalance 1115 is provided on the side of the laser 1112 opposite the pivot 1115. The laser 1112 is powered by power source 1118 and adapted to be rotated by motor 1121. Slip rings 1116 are provided for facilitating the rotation of the laser 1112.

The laser sighting device 1100 of FIG. 12 is adapted to operate in the same way as sighting device 1000 of FIG. 11. As the laser 1112 is rotated about the pivot point 1120, the laser beam 1114 is projected against the target (not shown) about the periphery of the infrared field of view 1161 of the infrared detector 1162.

Figure 13:
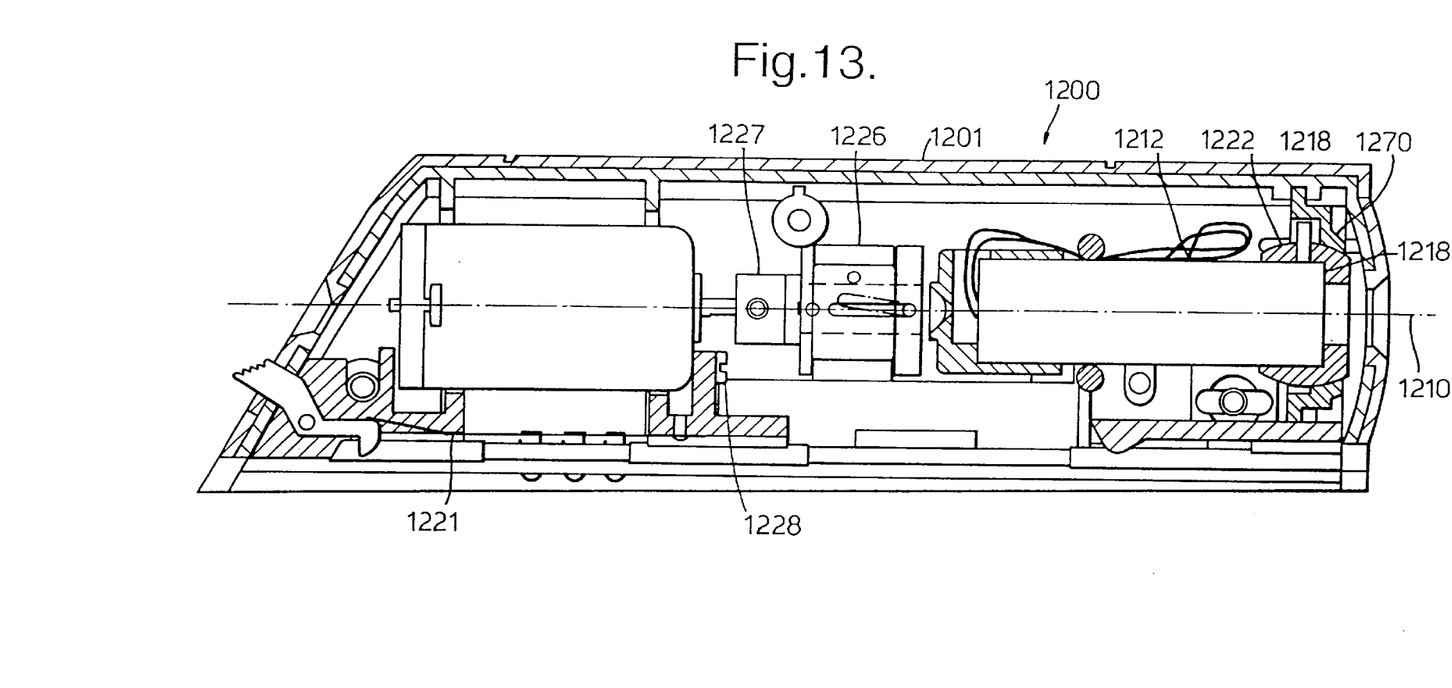
FIG. 13 is a side view illustrating still another modified version of the laser sighting device of the present invention.

FIG. 13 illustrates yet another embodiment of the laser sighting device of the present invention. Laser sighting device 1200 is provided as a stand-alone unit which may be mounted on and removed from standard infrared detectors or radiometers. The sighting device 1200 includes a laser 1212 contained within the housing 1201 of the sighting device

1200. Laser 1212 is adapted to project a laser beam 1214 against a target (not shown). The laser 1212 is powered by a power source (not shown). A motor 1221 is connected to the laser 1212 by rotational assembly 1227 thereby causing the laser to rotate within the housing 1201. A slider 1226 is further provided to facilitate rotation of the laser 1212 within the housing.

Adjustment screw 1217 is further provided for controlling the position of the motor 1221 and, as such, the direction of the laser beam 1214. A swivel ball 1222 is provided about the outward end of the laser 1212 which is seated in swivel ball seat 1220. Spring washer 1218 is further provided adjacent the swivel ball 1222.

The laser sighting device 1200 operates in substantially the same manner as the sighting devices depicted in FIGS. 11–12 in that the single laser 1212 is rotated by motor 1221 to cause the projecting laser beam to circle around the periphery of an infrared field.

Figure 14:
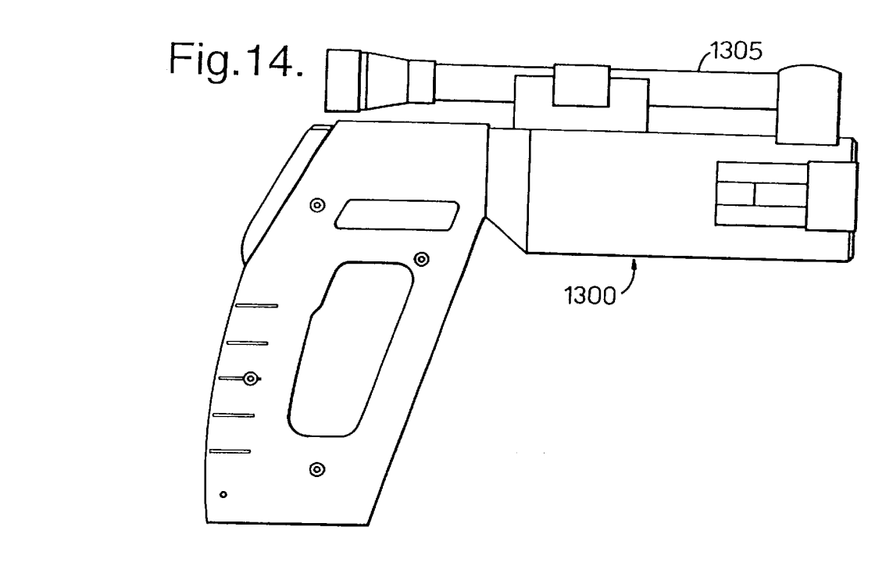
FIG. 14 is a side view of yet another embodiment of the invention in which the laser sighting device utilises twin laser beams provided on opposite sides of an infrared detector.
Figure 15:
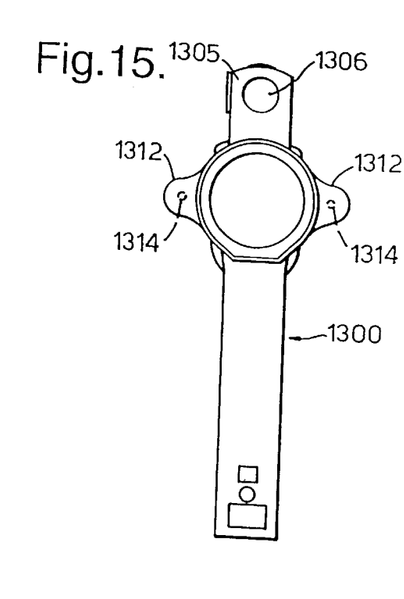
FIG. 15 is a front view of the embodiment of FIG. 14.
Figure 16:
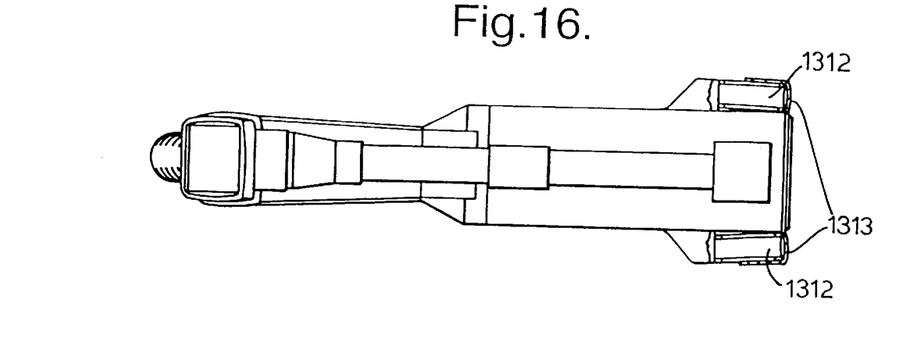
FIG. 16 is a top view of the embodiment of FIGS. 14–15.

FIGS. 14–16 illustrate yet another version of the laser sighting device of the present invention shown in combination with a radiometer. In the embodiment of FIGS. 14–16, a conventional radiometer 1300 is provided. The radiometer includes a telescope aiming sight 1305 with a lens 1306 mounted on the top thereof. Telescope aiming sight 1305 permits the user to aim the radiometer 1300 against a target.

At least two laser sighting devices 1312 are provided on opposite sides of the radiometer 1300. Device 1312 includes a pair of lasers 1314 provided within the laser sighting devices 1312 positioned on each side of the radiometer approximately 180 degrees apart which are adapted to project a pair of laser beams (not shown) toward a target on either side of the energy zone to be measured by the radiometer. In this manner, the laser beams are used to define the outer periphery of the energy zone being measured by the radiometer 1300.

Figures 17, 18:
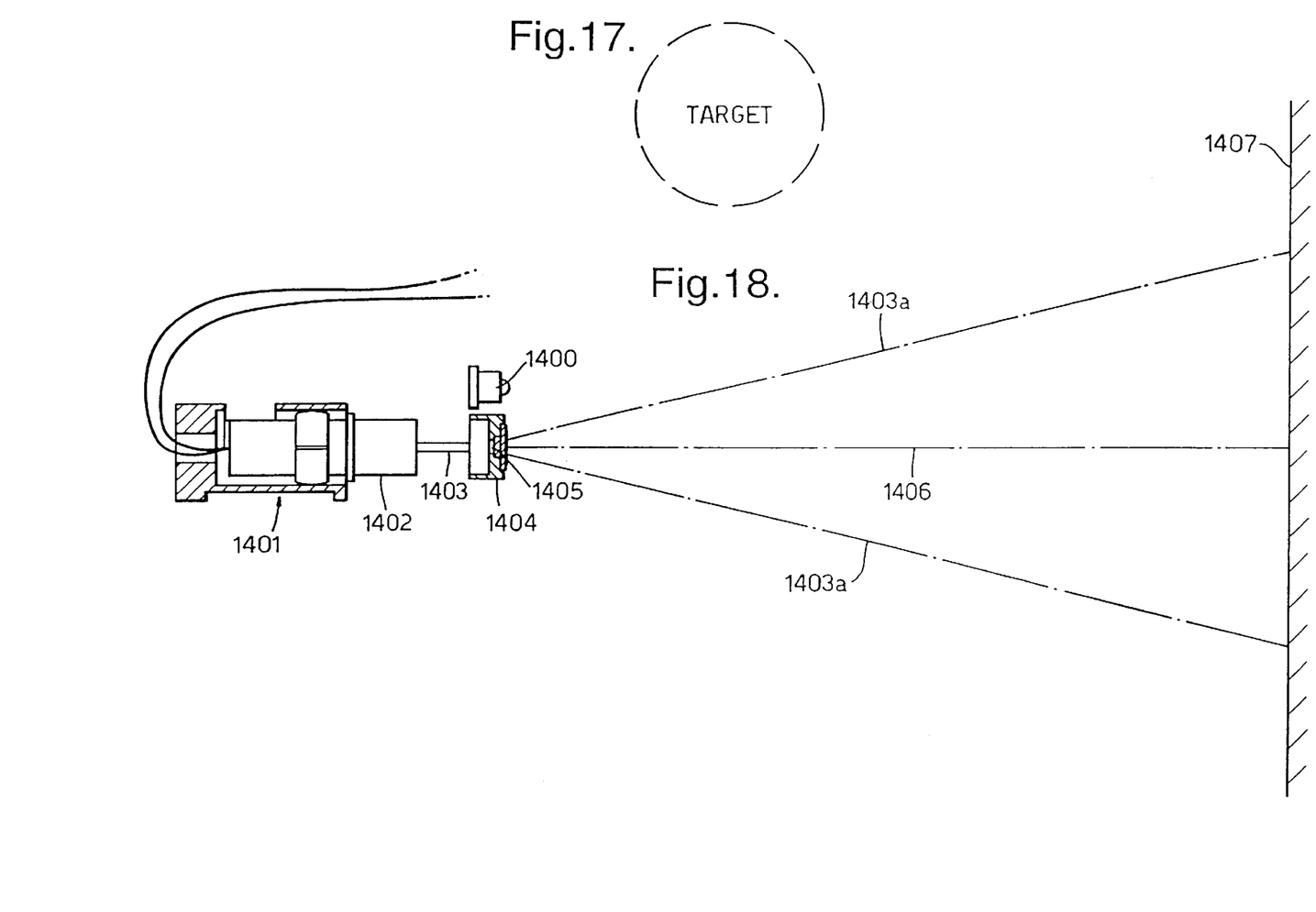
FIG. 17 illustrates the intermittent lines formed by a laser which is pulsed on and off in a synchronised manner.
FIG. 18 is an illustration in partial section of a preferred embodiment of the invention in which the laser sighting device utilizes a single laser beam which is divided and spread into a plurality of individual beams by means of a diffraction grating.
Figure 19:
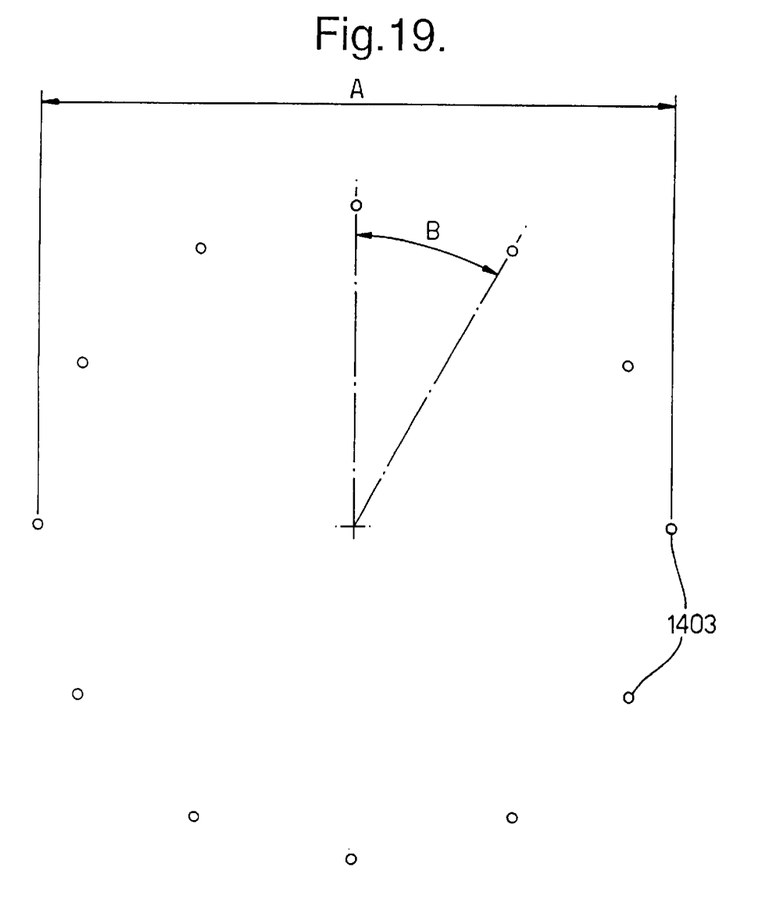
FIG. 19 is a diagram to show a pattern of dots of laser light, formed on a target area, as a result of impingement of the individual beams resulting from subdivision of the single beam of the laser.

In an alternate embodiment, the lasers depicted in FIGS. 11–16 may be pulsed on and off in a synchronised manner. FIG. 17 depicts the series of intermittent lines that serve to outline the energy zone in such an embodiment. The intermittent use of the laser in this embodiment results in an increase in the efficiency of the laser, which, in turn, allows for an increased concentration of the laser's total wattage in a smaller area, causing a brighter beam, FIGS. 18 and 19 illustrate yet another and preferred best mode version of the laser sighting device of the present invention, in combination with a radiometer. In this embodiment, a conventional radiometer 1400 is provided. A laser sighting device denoted generally by reference numeral 1401 has a single-beam laser generator 1402 which produces the laser beam 1403. Aligned axially with the laser beam 1403, and in front of the laser generator 1402, there is positioned a support 1404 housing a beam splitter, holographic component or a diffraction grating 1405. In this instance, the diffraction grating 1405 is selected when struck by the laser beam to produce, from the entering single beam 1403, a total of twelve sub-division beams 1403a which are symmetrically divergent about the axis 1406. Referring to FIG. 19 there is shown the pattern of laser light spots 1403b which are formed at individual mutually spaced locations, where the sub-division beams 1403a strike the target 1407 whose temperature is to be investigated. Due to the nature of the diffraction grating 1405, the spots 1403b are circumferentially equidistantly spaced by distance B in a circle about the axis of the laser beam 1403, and the total spread of the subdivision beams 1403a is a width A which depends upon the axial distance of the device from the target 1407.

Adjacent to and laterally of the laser generator 1402 in its support 1404 there is positioned a radiometer 1400 whose viewing axis is parallel to the axis 1406 of the generated laser beam, but which may if desired be made adjustable with respect to the axis 1406 so that a selected area of the target, perhaps not at the center of the dots 1403b may be investigated.

The apparatus of any one of FIGS. 2, 3, 4, 6, 8, 11, 12, 13 and 18 may further include means for projecting a laser beam axially to strike the surface zone to be measured, e.g. in FIG. 18 the diffraction grating 1405 would be selected to provide not only the sub-division beams 1403a but also a central sub-division beam along the axis 1406.

Figure 20:
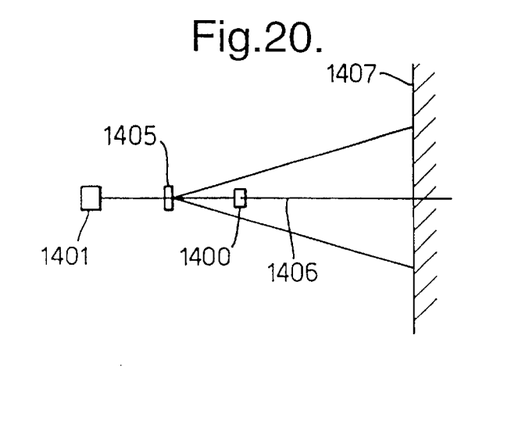
FIG. 20 is a diagram to show a modification wherein the radiometer is arranged on the axis of the laser beam.

Referring to FIG. 20, there is shown schematically a modification wherein the radiometer 1400 is situated on the central longitudinal axis of the laser generator 1401 and within said plurality of laser beams at a suitable distance downstream of the diffraction grating so as not to interfere with the transmission of the sub-division beams to form the pattern of spots.

In a practical form of construction, the laser beam generator 1401 and the diffraction grating support 1404 and the radiometer would conveniently be carried on a support structure, not shown, to provide a hand-held apparatus aimed at a selected area, or areas, to be investigated. Thus a method of identifying the extent of a radiation zone on a region whose temperature is to be measured may comprise the steps of providing a sighting device for use in conjunction with said radiometer, said device including means for generating a laser beam, splitting said laser beam into a plurality of three or more components by passing said beam through or over diffraction grating means, and directing said beat components towards said region so as to form a plurality of illuminated areas on said region where said beam components impinge on said region, and determining temperature at said region with said radiometer. Preferably, the diffraction grating means is such as to cause the laser beam to be sub-divided into a plurality of three or more beams which form illuminated areas arranged at intervals on a circle or other closed geometric figure on the region.

Having thus described the invention with particular reference to the preferred forms thereof, it will be obvious that various changes and modifications can be made therein without departing from the spirit and scope of the present invention as defined by the appended claims.

We claim:

1. In a hand held non-contact temperature measurement instrument comprising on a common support the combination of an infrared radiation detector and a laser aiming system, which system indicates visually on a target surface, the location on said surface from which infrared radiation is detected by said detector; and said system includes a laser beam generator; and an optical means:

the improvement in which said optical means converts a single laser beam from said generator into a visible single beam circular display on said surface and generates on said surface a continuous ring of laser light.

2. In a hand held non-contact temperature measurement instrument comprising on a common support the combination of an infrared radiation detector and a laser aiming system, which system indicates visually on a target surface the location on said surface from which infrared radiation is detected by said detector; and said system includes a laser beam generator and an optical means:

the improvement in which said optical means converts a single laser beam from said generator into a visible single beam continuous circular ring display pattern fanned out from said optical means to produce a circumferential continuous arcuate display of laser light ring segments.

3. In a hand held non-contact temperature measurement instrument comprising on a common support the combination of an infrared radiation detector and a laser aiming system, which system indicates visually on a target surface the location on said surface from which infrared radiation is detected by said detector; and said system includes a laser beam generator and an optical means:

the improvement in which said optical means converts a single rotated laser beam from said generator into a visible single beam circular display on said surface and generates on said surface a continuous rotated ring of laser light.

4. In a hand held non-contact temperature measurement instrument comprising on a common support the combination of an infrared radiation detector and a laser aiming system, which system indicates visually on a target surface from which infrared radiation is detected by said detector; and said system includes a laser beam generator and an optical means:

the improvement in which said system emits a single laser beam as a continuous ring display pattern on said surface whose temperature is to be measured and directs said single beam to said surface to identify said location on said surface of infrared radiation to be measured.

5. In a hand held non-contact temperature measurement instrument comprising on a common support the combination of an infrared radiation detector and a laser aiming system, which system indicates visually on a target surface the location on said surface from which infrared radiation is detected by said detector; and said system includes a laser beam generator and an optical means:

the improvement in which said detector has a field of view visually indicated on said surface by a continuous ring of laser light which encloses the area on said surface from which at least 90% of the infrared radiation is measured.

* * * * *